United States Patent Office 2,906,663
Patented Sept. 29, 1959

2,906,663

KETALS OF METHYLENEDIOXY-PROPIOPHENONE

Saul Chodroff, Brooklyn, N.Y., Albert Saldarini, Union City, N.J., and Ralph L. Tracy, Miller Place, N.Y., assignors to Norda Essential Oil and Chemical Company, New York, N.Y., a corporation of New York No Drawing. Application August 19, 1957
Serial No. 679,080

11 Claims. (Cl. 167—24)

This invention relates to novel ketals of methylenedioxypropiophenones, which are synergists for pyrethrum, and to insecticidal pyrethrum compositions containing such ketals.

The pyrethrins and pyrethrin-like compounds, such as allethrin, furethrin, and cyclethrin, are well known and very useful insecticides. However, because of their high cost, it is necessary to use them in a minimum concentration, enhancing their activity by use of a synergist. A synergist has little or no insecticidal activity in itself, but enhances the insecticidal activity of the pyrethrins or synthetic pyrethrin compounds, and thereby serves as an extender of these materials. In order for a synergist to be useful, it must be nontoxic, and, of course, it must have a high synergistic activity.

Haller, La Forge and Sullivan, Journal of Organic Chemistry, 7, 185 (1942), showed that the most active synergistic component of sesame oil was sesamin. It has been demonstrated that the 3,4-methylenedioxyphenyl group is necessary for sesamin's activity, and that this activity is influenced by groups substituted on the phenyl ring. This has stimulated research for compounds similar to sesamin and which would have a greater synergistic effect. As a result of this research, excellent pyrethrin synergists have been developed, such as piperonyl butoxide (Wachs, Science, 105, 530 (1947)), piperonyl sulfoxide (Synerholm, Hartzell and Cullmann, Contributions of the Boyce Thompson Institute, 15, 35 (1947)), piperonyl cyclonene (Wachs, Science, 105, 530 (1947)), and n-propyl isomer (Synerholm and Hartzell, Contributions of the Boyce Thompson Institute, 14, 79 (1945)). It was also shown that another component of sesame oil, sesamolin, was about five times as effective as sesamin (Beroza, Journal of the American Oil Chemists' Society, 31, 302 (1954)). Beroza in his later article Journal of Agricultural and Food Chemistry, 4, 49 (1956) points out that the intense activity of sesamolin indicated that the ultimate in synthetic synergists had not yet been obtained, inasmuch as sesamolin is far more effective a synergist than the best commercial synergist known to date. Beroza, accordingly, undertook an investigation of synergists similar to sesamolin in structure, departing from the previous line of attack developing synergists having a sesamine structure. Beroza prepared and tested a group of 3,4-methylenedioxyphenyl ethers, acetals, esters and sulfonates. Many of the compounds were found to be true synergists, showing no appreciable toxicity in the absence of pyrethrins, and being strongly synergistic in the presence of pyrethrins.

The compounds of the invention are asymmetrical ketals of methylenedioxyphenylpropiophenone having the general structure:

(1) 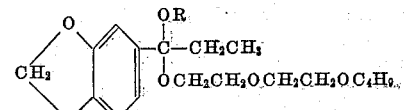

where R is an alkyl radical having from one to about six carbon atoms, or a tetrahydrofurfuryl radical. Typical R alkyl radicals are, for example, methyl, ethyl, propyl, isopropyl, butyl, isobutyl, tertiary butyl, amyl, neopentyl, tert-amyl, isoamyl, hexyl, isohexyl, tert-hexyl and neohexyl.

The compounds of the invention can be prepared from isosafrole. Halogen, preferably chlorine or bromine, is added across the double bond of the propenyl side chain of isosafrole in an inert solvent or alcohol. The reaction product is reacted with an excess of alcohol corresponding to R, the α-chlorine being displaced by an R alkoxy group, yielding an α-(methylenedioxyphenyl) β-halogen propyl alkyl ether. This compound is dehydrohalogenated with potassium hydroxide in alcohol or glycol as a solvent to yield an α-(methylenedioxyphenyl) propenyl alkyl ether. Butyl carbitol is added across this double bond under the influence of an acid catalyst to yield the asymmetrical alkyl butoxy ethoxyethyl ketals of methylenedioxyphenylpropiophenone. The following series of reactions take place:

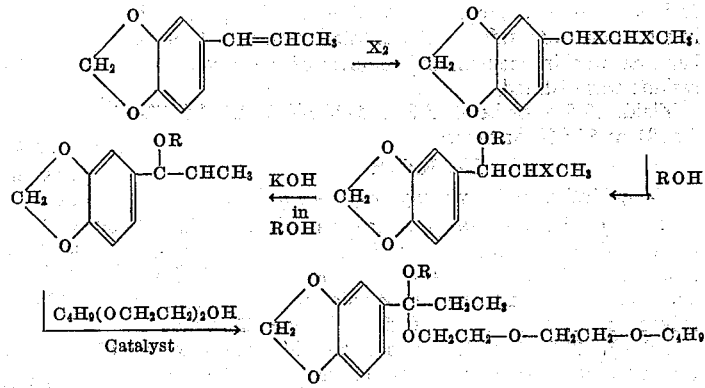

The following preparatory procedures are illustrative:

EXAMPLE 1

α-Methylenedioxyphenylpropenylmethyl ether

To 162.2 g. of isosafrole in 162 ml. of petroleum ether was added a solution of 50 ml. of bromine in 162 ml. of petroleum ether at 0–5° C. in one-half hour. The mixture was stirred an additional hour, the solvent was removed in vacuo (residue was an azure blue color). 250 ml. of methanol was added to the stripped dibromoisosafrole and refluxed on the steam bath for eight hours, during which time methyl bromide was evolved. The solvent was stripped under vacuum (maximum pot temperature did not exceed 65° C.). The crude α-methoxy β-bromo dihydrosafrole was added to a solution of 84 g. of potassium hydroxide in 200 ml. of propylene glycol at 110° C. and the mixture heated at 130° C. for four hours to complete the dehydrohalogenation. The reaction mixture was drowned in a large excess of water (200 ml.), extracted with hexane, washed neutral, dried, the solvent removed and the residue vacuum distilled, yielding 148.7 g. of α-methylenedioxyphenylpropenylmethyl ether, B.P. 102–108/0.7 mm., R.I. 1.5557–1.5585, yield 77% of theory.

A simplified and improved procedure was developed in which halogenation was conducted in alcoholic solution at 0–5° C. and the dihalide reacted with the alcohol directly.

To 163 g. of isosafrole in 300 ml. of methanol was added at 0–5° C. in fifteen minutes, 89 g. of chlorine (excess). The mixture was stirred without cooling for one hour (temperature rose to 20° C. in one hour). The mixture was heated for ten hours on the steam bath at reflux, evolving methyl chloride. The excess methanol was removed in vacuo, the residue taken up in hexane, washed with water and sodium bicarbonate and dried. The solvent was removed in vacuo and the residue distilled in vacuo over 1 ml. of tributylamine as a stabilizer, collecting:

208.3 g. B.P. 110–112/0.7 mm., R.I. 1.5369–1.5379—91% theory.

15.7 g. B.P. 120/0.7 mm., R.I. 1.5444—97.8% theory.

To a solution of 84 g. potassium hydroxide in 200 ml. of propylene glycol was added 217.6 g. of methoxy-β-chloro-dihydrosafrole at 110° C. The mixture was heated at 130–140° C. for four hours, cooled, diluted with 800 ml. of water, extracted with 300 ml. benzene, washed neutral, the solvent removed in vacuo and the residue distilled.

Yield: 151.8 g. of α-methylenedioxyphenylpropenylmethyl ether. B.P. 90/0.4 mm., R.I. 1.5562–1.5564 or 82.3% of theory or 80.3% from isosafrole.

*Methyl butoxy ethoxyethyl ketal of methylenedioxypropiophenone*

To 19.4 g. of butyl Carbitol containing 3 drops of concentrated HCl was added 19.3 g. of α-methylenedioxyphenylpropenylmethyl ether at room temperature, in ten minutes, the temperature of the reaction mixture rising to 40° C. The reaction was maintained at 50° C. for four and one-half hours, cooled and diluted with excess dilute sodium hydroxide. After extraction with 100 ml. of benzene, washing neutral and removal of the solvent, the residue was distilled.

Yield: 18.5 g. of ketal, B.P. 175–180/0.8, R.I. 1.5172–1.5181 or 52.9% of theory.

EXAMPLE 2

*α-Methylenedioxyphenylpropenylethyl ether*

162.2 g. of isosafrole (1 mole) was dissolved in 200 ml. of chloroform and cooled to 0.5° C. 160 g. of bromine was added at this temperature over a period of one and one-half hours. The purple solution was stripped of solvent under vacuum at 40–50° C. (the dibromide is unstable). 300 ml. of 2B ethanol was added and refluxed for two hours. One half of the ethanol was removed in vacuum, the residue cooled and poured into 1 liter of water. The organic material was extracted with 2×150 ml. of hexane, the extracts combined and washed with water and sodium bicarbonate solution. After drying over CaCl₂, the solvent was stripped, leaving a dark brown residue, which decomposed on attempted distillation. The crude ethoxybromo dihydrosafrole was added to a solution of 84 g. potassium hydroxide in 200 ml. propylene glycol at 120° C. The temperature rose spontaneously to 130° C. and was maintained at 130° C. for four hours. Potassium bromide precipitated during the reaction. The mixture was cooled, diluted with 800 ml. of water and extracted with 2×150 ml. of hexane. The organic extracts were washed neutral, the solvent stripped and the fraction boiling at 115–118/0.9 mm. was collected.

Yield: 120 g. or 58% theory.

Using chlorine instead of bromine, the intermediates are more stable and α-ethoxy β-chloro dihydrosafrole can be isolated in good yield.

106 g. (1.5 mole) of chlorine was dissolved in 300 ml. of chloroform and a solution of 202.7 g. (1.25 mole) of isosafrole in 125 ml. CHCl₃ was added below 20° C. The solvent was removed, 300 ml. of 2B ethanol added, and the mixture heated on the steam bath for eight hours (ethyl chloride was evolved). The excess alcohol was removed under vacuum (maximum temperature 50° C., acid vapors noted during the end of distillation). The residue was taken up in solvent (300 ml. hexane), washed neutral and distilled, collecting 267 g. (or 88% of theory) of α-ethoxy β-chloro dihydrosafrole, B.P. 105–111/0.4 mm., R.I. 1.5327–1.5349.

*Ethyl butoxy ethoxyethyl ketal of methylenedioxypropiophenone*

20.6 g. of α-methylenedioxyphenylpropenylethyl ether was added in fifteen minutes at 10° C. to 19.4 g. of butyl Carbitol containing 3 drops of concentrated HCl. The mixture was stored at 5° C. overnight and poured into excess dilute sodium hydroxide solution, extracted with benzol, washed neutral, dried and distilled, collecting 17.4 g. of product, B.P. 175–183/0.8 mm., R.I. 1.5177–1.5185 or 47.2% of theory.

EXAMPLE 3

*α-Butoxy β-chloro dihydrosafrole*

71 g. of chlorine was added to 162.2 g. of isosafrole in 300 ml. of n-butanol in fifteen minutes at 0° C. The mixture was allowed to stir for one hour while the temperature rose to 25° C. It was then refluxed for ten hours, cooled, diluted with 600 ml. of water, the organic layer extracted and washed neutral. After drying the solution over sodium sulfate, the solvent was stripped and the residue vacuum distilled, yielding 253 g. of product, B.P. 135/0.5 mm. 93% of theory.

*α-Methylenedioxyphenylpropenylbutyl ether*

249 g. of α-butoxy β-chloro dihydrosafrole was added to 84 g. potassium hydroxide in 200 g. propylene glycol at 110° C. and heated to 130–140° C. for four hours, cooled, diluted with 600 ml. of water. The organic layer was extracted with 2×150 ml. of benzene, washed neutral and dried. The solvent was removed and the residue distilled, yielding 159.4 g. of ether, B.P. 127/0.5 mm., R.I. 1.5277–1.5289 or 74.6% of theory.

*Butyl butoxy ethoxyethyl ketal of methylenedioxypropiophenone*

46.8 g. of α-methylenedioxyphenylpropenylbutyl ether was added to 32.4 g. of butyl Carbitol containing 4 drops of concentrated HCl at 10° C. After standing overnight at room temperature, the mixture was diluted with excess dilute NaOH, extracted with hexane, washed neutral and vacuum distilled, yielding 23.6 g., B.P. 160–165/0.15 mm., R.I. 1.5167.

EXAMPLE 4

*α-Tetrahydrofurfuryl-β-chlorodihydrosafrole*

To 162 g. of isosafrole in 204 g. of tetrahydrofurfuryl alcohol was added 71 g. of chlorine at 0–10° C. The mixture was stirred for twenty-five minutes and heated at 90° C. under 15 inches of vacuum to remove free HCl which might destroy the alcohol present. After seven hours, the mixture was cooled, diluted with 500 ml. of water, extracted with 200 ml. of benzene, washed neutral and vacuum distilled. Yield: 150 g. of product, B.P. 152–160°/2.5 mm., R.I. 1.5354.

*α-(3,4-methylenedioxyphenyl) propenyl tetrahydrofurfuryl ether*

180 g. of α-tetrahydrofurfuryl β-chloro dihydrosafrole was added to 63 g. potassium hydroxide in 150 ml. propylene glycol at 110° C. The mixture was heated to 130° C. for four hours, cooled, diluted with 500 ml. of water, extracted with benzene, washed neutral and distilled.

Yield: 47.7 g. of ether, B.P. 150–158/0.45 mm., R.I. 1.5485—30% theory.

*Tetrahydrofurfuryl butoxy ethoxyethyl ketal of 3,4-methylenedioxypropiophenone*

19.1 g. of α-(3,4-methylenedioxyphenyl) propenyl, tetrahydrofurfuryl ether was added to 11.4 g. of butyl Carbitol containing 2 drops of concentrated HCl at 35–40° C., stirred three hours at 35–40° C. remaining overnight at room temperature, and poured into excess dilute 5% NaOH. The solution was extracted with hexane, washed neutral, dried and vacuum distilled.

Yield: 11.1 g., B.P. 175–183/0.85 mm., R.I. 1.5204–1.5270, 37% of theory.

The synergistic activity of the above ketals for pyrethrin extract was determined by standardized tests on houseflies and cockroaches.

Synergistic activity against cockroaches was measured by the official method of Chemical Specialties Manufacturing Association for evaluating cockroach sprays (Soap and Chemical Specialties Blue Book (1956), page 249). The method was modified by weighing each spray dose rather than measuring volume to the spray, and by holding the treated roaches in widemouth gallon jars, rather than the official dish.

The activity against houseflies was evaluated by a modified Peet-Grady procedure (Ibid, page 243), as follows: A circular chamber made of ¼ inch mesh wire screen, fastened to a light wooden frame, and lined inside on the walls and floor with 90 pound kraft paper was used. The chamber was 36 inches in diameter and 35 inches high, giving a volume of 20.6 cubic feet, which closely approximated 1/10 of the volume of the official Peet-Grady chamber, 216 cubic feet of space. The top of the chamber was covered with a removable round plate glass top. After each test, new, clean paper was inserted into the chamber. The test dose of insecticide was modified to approximately 1.2 ml., or 1/10 volume that was used in the Peet-Grady procedure. The exact weight of each dose of spray was determined. The Devilbiss spray gun used in the official test was also used in the modified procedure.

In Table I there are given the data for methyl, ethyl, butyl, and tetrahydrofurfuryl ketals. These are the compounds of Examples 1 to 4 above, respectively. The data show that marked synergistic activity is displayed by these ketals for pyrethrins. This is particularly evident from the data on the OTI difference in percent kill, calculated per milligram of pyrethrin extract. The data show that as the R radical increases in size, activity diminishes.

TABLE I
*Arithmetical means*
TEST DATA AGAINST HOUSEFLIES

| Example No. | | Test insecticides, pyr./T.S. mg./100 cc. | Ratio | Actual dose, mg. pyr./T.S. | Number test flies | Percent KD[1] | Percent kill | OTI diff., percent | Percent kill[2] per mg. pyr. | OTI diff.[3] mg./percent K. |
|---|---|---|---|---|---|---|---|---|---|---|
| Control | OTI[4] | 100/0 | | 1.21/0 | 310 | 95 | 46 | | 38 | |
| | ½ OTI | 50/0 | | 0.61/0 | 1,766 | 80 | 24 | | 39 | +1 |
| | ¼ OTI | 25/0 | | 0.30/0 | 798 | 60 | 11 | | 37 | −1 |
| (1) Methyl butoxy ethoxyethyl ketal | A | 50/200 | 1+4 | 0.616/2.46 | 1,416 | 95 | 70 | +40 | 114 | +89.5 |
| | OTI | 100/0 | | 1.23/0 | 865 | 90 | 30 | | 24.5 | |
| | B | 50/100 | 1+2 | 0.615/1.23 | 1,525 | 97 | 76 | +41 | 124 | +96.0 |
| | OTI | 100/0 | | 1.25/0 | 960 | 94 | 35 | | 28 | |
| | C | 50/50 | 1+1 | 0.612/.612 | 1,952 | 93 | 67 | +16 | 108 | +68.0 |
| | OTI | 100/0 | | 1.26/0 | 2,262 | 88 | 51 | | 40 | |
| | D | 25/100 | 1+4 | 0.316/1.26 | 1,781 | 89 | 65 | +14 | 205 | +165 |
| | OTI | 100/0 | | 1.26/0 | 2,262 | 88 | 51 | | 40 | |
| (2) Ethyl butoxy ethoxyethyl ketal | A | 50/200 | 1+4 | 0.621/2.4 | 1,265 | 94 | 62 | +27 | 100 | +70.5 |
| | OTI | 100/0 | | 1.19/0 | 1,523 | 92 | 35 | | 29.5 | |
| | B | 50/100 | 1+2 | 0.619/1.24 | 1,726 | 96 | 73 | +27 | 118 | +88.5 |
| | OTI | 100/0 | | 1.25/0 | 1,368 | 92 | 46 | | 36.5 | |
| | C | 50/50 | 1+1 | 0.609/.609 | 2,082 | 95 | 63 | +21 | 104 | +70 |
| | OTI | 100/0 | | 1.23/0 | 2,166 | 90 | 92 | | 34 | |
| | D | 25/100 | 1+4 | 0.305/1.22 | 1,437 | 91 | 47 | | 156 | +122 |
| | OTI | 100/0 | | 1.22/0 | 1,446 | 91 | 41 | | 34 | |
| (3) Butyl butoxy ethoxyethyl ketal | A | 50/200 | 1+4 | 0.612/2.45 | 1,188 | 94 | 85 | +38 | 139.0 | +100.4 |
| | OTI | 100/0 | | 1.21/0 | 1,414 | 89 | 47 | | 38.6 | |
| | B | 50/100 | 1+2 | 2.594/1.19 | 1,131 | 97 | 69 | +26 | 134.0 | +98.4 |
| | OTI | 100/0 | | 1.20/0 | 1,361 | 95 | 43 | | 35.6 | |
| | C | 50/50 | 1+1 | 0.626/.626 | 1,124 | 94 | 57 | +13 | 91.0 | +54.5 |
| | OTI | 100/0 | | 1.20/0 | 1,361 | 94 | 44 | | 36.5 | |
| | D | 25/100 | 1+4 | 0.322/1.29 | 933 | 81 | 35 | +1 | 109.0 | +81.5 |
| | OTI | 100/0 | | 1.24/0 | 1,013 | 91 | 34 | | 27.5 | |
| (4) Tetrahydrofurfuryl butoxy ethoxyethyl ketal | A | 50/200 | 1+4 | 0.637/2.55 | 349 | 86 | 57 | +39 | 89.0 | +75 |
| | OTI | 100/0 | | 1.27/0 | 398 | 72 | 18 | | 14.0 | |
| | B | 50/100 | 1+2 | 0.687/1.37 | 462 | 90 | 82 | +44 | 119.0 | +91.5 |
| | OTI | 100/0 | | 1.37/0 | 456 | 85 | 38 | | 27.5 | |

TEST DATA AGAINST COCKROACHES

| | Ratio | Actual dose, mg. pyr./T.S. | Number of roaches | | | | | | | | Percent kill | | Percent diff., 48 hrs. | Percent kill mg. 48 hrs. |
|---|---|---|---|---|---|---|---|---|---|---|---|---|---|---|
| | | | Total | Alive | | Moribund | | Dead | | | 24 hrs. | 48+ hrs. | | |
| | | | | 24 hrs. | 48 hrs. | 24 hrs. | 48 hrs. | 24 hrs. | 48 hrs. | | | | | |
| (2) Ethyl butoxy ethoxyethyl ketal, 50/400 | 1+8 | 0.110/1.36 | 100 | 37 | 16 | 10 | 3 | 53 | 81 | | 63 | 84 | +13 | 476 |
| OTI, 100/0 | | 2.97/0 | 100 | 37 | 29 | 10 | 6 | 53 | 65 | | 63 | 71 | | 239 |
| (3) Butyl butoxy ethoxyethyl ketal, 50/40 | 1+8 | 0.170/.136 | 100 | 32 | 11 | 13 | 1 | 55 | 88 | | 68 | 89 | −1 | 520 |
| OTI, 100/0 | | 0.298/0 | 100 | 17 | 10 | 3 | 0 | 80 | 90 | | 83 | 90 | | 300 |

[1] Percent KD indicates percent of flies knocked down in ten minutes.
[2] Kill per mg. indicates the percent kill produced theoretically by 1 mg. of pyrethrum for unit of comparison.
[3] Difference between percent kill per mg. of OTI and synergized pyrethrum.
[4] OTI refers to the C.S.M.A. Official Test Insecticide.

Table II gives data for another group of ketals, comparing compounds with and without the butoxy ethoxyethyl group and with substituents in the 3,4-methylenedioxyphenyl ring. The data should be compared with Table I.

creases, activity diminishes. Compare, for instance, the effectiveness of these compounds against Examples 1, 2, and 3 in Table I.

To test the toxicity of the ketals, doses of 500 mg./k., 2000 mg./k., and 4500 mg./k. of each ketal of Examples

TABLE II

| Compound No. | Test insecticides, pyr./T.S. mg./100 cc. | Ratio | Actual dose, mg. pyr./T.S. | No. test flies | Percent KD | Percent kill | OTI diff., percent |
|---|---|---|---|---|---|---|---|
| (1) 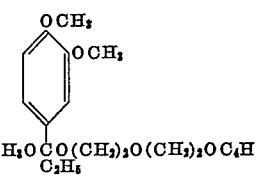 | 4.24.5-7 OTI | 50/200<br>100/0 | 1+4 | 0.615/2.46<br>1.27/0 | 465<br>803 | 70<br>87 | 4<br>17 | −13 |
| (2) 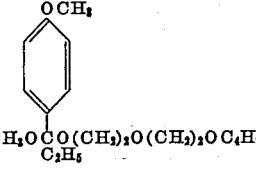 | 4.28.8.10 OTI | 50/200<br>100/0 | 1+4 | 0.631/2.52<br>1.27/0 | 394<br>803 | 84<br>81 | 7<br>17 | −10 |
| (3) 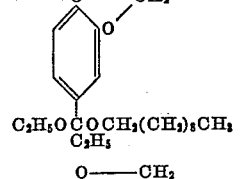 | 3.15.15.18 OTI | 50/400<br>100/0 | 1+8 | 0.629/5.05<br>1.21/0 | 755<br>1,076 | 80<br>89 | 17<br>40 | −23 |
| (4) 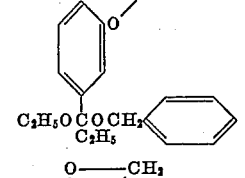 | OTI | 50/100<br>100/0 | 1+2 | 0.620/1.22<br>1.20/0 | 531<br>687 | 81<br>85 | 37<br>42 | −5 |
| (5) 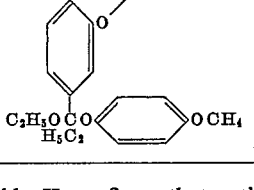 | OTI | 50/100<br>100/0 | 1+2 | 0.601/1.2<br>1.25/0 | 739<br>913 | 84<br>87 | 35<br>38 | −3 |

Table II confirms that activity is influenced by both ring substitution and by the butoxy ethoxyethyl group. Compounds 1 and 2 show that methoxy radicals in the 3,4-methylenedioxyphenyl radical destroy activity and do not come within the invention. Compounds 3 to 5 show that decyl, benzyl, and methoxy radicals destroy activity when replacing the butoxy ethoxyethyl group. The superiority of the compounds of the invention over these compounds is evident. As the size of the R radical in- 1 to 4, inclusive, were injected intraperitoneally into two male and two female young adult white rats. No clinical symptoms or other unwarranted signs of toxicity were observed during fifteen days following the injections. No deaths occurred.

EXAMPLE 5

A series of insecticidal pyrethrin compositions in deodorized kerosene were prepared containing 0.1% of the ethyl butoxy ethoxyethyl ketal of Example 2, 0.05% pyrethrin extract, and 0.1% of a mixture of 51% sesamin and 38% sesamolin, obtained by extraction of sesame oil pursuant to the procedure described in Example 8 of U.S. Patent No. 2,837,534, issued June 3, 1958, to Ralph L. Tracy. The mixture of sesamin and sesamolin is not soluble in kerosene, whereas the ethyl butoxy ethoxyethyl ketal is. The mixture is soluble in the ethyl butoxy ethoxyethyl ketal, and thus the two together can be used in solution in kerosene.

The data show that these two synergists are not antagonistic, but have an additive synergistic activity:

TABLE III

| Test sols. and Test Nos. | Test insecticide, pyr./T.S. mg./100 cc. | Ratio | Actual dose, mg. pyr./T.S. | Number test flies | Percent KD | Percent kill | OTI diff., percent | Percent K./mg. | Diff. mg./percent K. |
|---|---|---|---|---|---|---|---|---|---|
| 3.27.9-12 OTI | [1] 50/200 | 1+4 | .634/2.53 | 761 | 97 | 84 | +46 | 132.0 | 104.3 |
|  | 100/0 |  | 1.37 | 456 | 85 | 38 |  | 27.7 |  |
| 11.21.7-8 sesolin OTI | 50/200 | 1+4 | .60/2.41 | 639 | 99 | 87 | +40 | 146 | +109 |
|  | 100/0 |  | 1.25/0 | 600 | 97 | 47 |  | 37 |  |
| 11.29.5-8 sesolin OTI | 50/100 | 1+2 | .50/1.20 | 1,011 | 98 | 78 | +31 | 131 | 94 |
|  | 100/0 |  | 1.25/0 | 600 | 97 | 47 |  | 37 |  |
| Ethyl ketal OTI | 50/100 | 1+2 | .619/1.24 | 1,726 | 96 | 73 | +27 | 118 | 81 |
|  | 100/0 |  | 1.25/0 | 1,368 | 92 | 46 |  | 37 |  |

[1] Test insecticide contains 50 mg. pyrethrins/100 ml. and 100 mg. sesolin+100 mg. ethyl ketal.

The ketal synergists in accordance with the invention are useful in pyrethrin insecticide formulations of conventional composition. The compounds may be added to a previously compounded pyrethrin insecticide in a mineral oil base, or may be combined with a toxic plant or animal pyrethrin extract, or synthetic material, and the mixture suitably diluted with mineral oil. The ketals are soluble in mineral oil, e.g. petroleum, solvents, such as kerosene, which facilitates their use, since these are preferred solvents for pyrethrins. The mineral oil also may be used as the solvent or carrier for the insecticidal formulation and combined with water and an emulsifier to form an aqueous emulsion.

The synergists also may be combined with pyrethrin formulations supported on carriers, so as to be in the form of dry powders or pastes.

Synergists may be added to the pyrethrin-containing material by grinding the source material of the pyrethrin with the synergists.

Even small amounts of the ketals enhance the insecticidal activity of the pyrethrins. An optimum effect is obtained using from 2 to 4 mg. of synergist per milligram of pyrethrins. Amounts as high as 8 milligrams have been used. However, the synergistic effect diminishes as amounts increase beyond 8 milligrams, and, therefore, larger amounts than this ordinarily would not be used, since the excess amount is, in effect, wasted.

We claim:

1. An asymmetrical ketal of methylenedioxyphenylpropiophenone having the general structure:

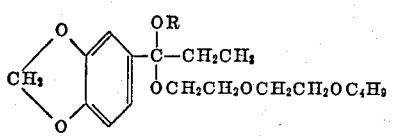

where R is selected from the group consisting of alkyl radicals having from one to about six carbon atoms, and tetrahydrofurfuryl radicals.

2. Methyl butoxy ethoxyethyl ketal of methylenedioxyphenylpropiophenone.
3. Ethyl butoxy ethoxyethyl ketal of methylenedioxyphenylpropiophenone.
4. Butyl butoxy ethoxyethyl ketal of methylenedioxyphenylpropiophenone.
5. Tetrahydrofurfuryl butoxy ethoxyethyl ketal of methylenedioxyphenylpropiophenone.
6. An insecticidal composition comprising pyrethrins and an asymmetrical ketal of methylenedioxyphenylpropiophenone having the general structure:

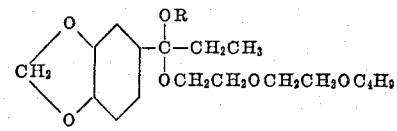

where R is selected from the group consisting of alkyl radicals having from one to about six carbon atoms, and tetrahydrofurfuryl radicals.

7. An insecticidal composition comprising pyrethrins and methyl butoxy ethoxyethyl ketal of methylenedioxyphenylpropiophenone.
8. An insecticidal composition comprising pyrethrins and ethyl butoxy ethoxyethyl ketal of methylenedioxyphenylpropiophenone.
9. An insecticidal composition comprising pyrethrins and butyl butoxy ethoxyethyl ketal of methylenedioxyphenylpropiophenone.
10. An insecticidal composition comprising pyrethrins and tetrahydrofurfuryl butoxy ethoxyethyl ketal of methylenedioxyphenylpropiophenone.
11. A process for combatting insects which comprises applying to the insects an insecticidal composition comprising pyrethrins and an asymmetrical ketal of methylenedioxyphenylpropiophenone having the general structure:

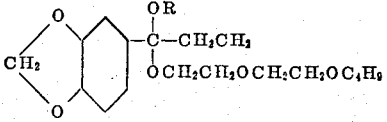

where R is selected from the group consisting of alkyl radicals having from one to about six carbon atoms, and tetradrofurfuryl radicals.

References Cited in the file of this patent

Synerhold et al.: Contributions from Boyce Thompson Inst., vol. 14, pp. 79–89, December 1945.
Wachs: Science, pp. 530–531, May 16, 1947.

UNITED STATES PATENT OFFICE
Certificate of Correction

Patent No. 2,906,663  September 29, 1959

Saul Chodroff et al.

It is hereby certified that error appears in the printed specification of the above numbered patent requiring correction and that the said Letters Patent should read as corrected below.

Column 3, line 38, for "-methylnedioxyphen-" read — -methylenedioxyphen- —; column 7, Table II, first column, the formula in compound No. (5) should read as shown below instead of as in the patent:

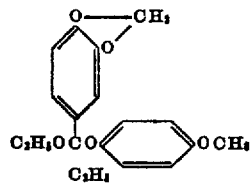

column 10, line 64, for "tetradrofurfuryl" read — tetrahydrofurfuryl—.

Signed and sealed this 12th day of April 1960.

[SEAL]

Attest:
KARL H. AXLINE,
*Attesting Officer.*

ROBERT C. WATSON,
*Commissioner of Patents.*